United States Patent [19]

Patzschke et al.

[11] Patent Number: 5,219,957
[45] Date of Patent: Jun. 15, 1993

[54] WATER-DILUTABLE VEHICLES BASED ON EPOXIDE RESINS, METHODS FOR THEIR SYNTHESIS AND THEIR USE AS AQUEOUS COATING MATERIALS AS WELL AS AQUEOUS COATING MATERIALS

[75] Inventors: Hans-Peter Patzschke, Wuppertal; Joachim Blum, Remscheid; Gerhard Friederichs, Wuppertal; Wolfgang Bogdan, deceased, late of Wuppertal, all of Fed. Rep. of Germany, by Elke Bogdan, legal representative

[73] Assignee: Herberts Gesellschaft mit beschränkter Haftung, Wuppertal, Fed. Rep. of Germany

[21] Appl. No.: 715,785

[22] Filed: Jun. 14, 1991

[30] Foreign Application Priority Data

Jun. 14, 1990 [DE] Fed. Rep. of Germany ....... 4019030

[51] Int. Cl.$^5$ .......................................... C08F 283/00
[52] U.S. Cl. ................... 525/530; 525/107; 525/930
[58] Field of Search ................ 525/107, 530, 930

[56] References Cited

U.S. PATENT DOCUMENTS

| Re. 31,985 | 9/1985 | Hayashi et al. | 523/504 |
|---|---|---|---|
| 4,136,070 | 1/1979 | Hazan | 525/107 |
| 4,355,122 | 10/1982 | Fan | 525/530 |
| 4,399,241 | 8/1983 | Ting et al. | 525/107 |
| 4,442,246 | 4/1984 | Brown et al. | 525/530 |
| 4,522,961 | 6/1985 | Martino et al. | 523/403 |
| 4,532,309 | 7/1985 | Lindert | 525/530 |
| 4,612,352 | 9/1986 | Schäfer et al. | 525/530 |
| 4,638,020 | 1/1987 | Christenson et al. | 523/402 |
| 4,680,348 | 7/1987 | Satoh et al. | 525/930 |
| 4,801,653 | 1/1989 | Das et al. | 525/530 |

*Primary Examiner*—Melvyn I. Marquis
*Assistant Examiner*—Randy Gulakowski
*Attorney, Agent, or Firm*—Cornman & Gross Schweitzer

[57] ABSTRACT

Vehicles, which are water dilutable after neutralization with bases, have an acid number of 5 to 60 and are obtainable by polymerization or copolymerization of 10 to 90 parts by weight of one or several acidic, phosphoric acid-functional unsaturated monomers, which are polymerizable by a free radical mechanism and can be present in admixture with one or several ethylenically unsaturated monomers, which are also polymerizable by a free radical mechanism, with addition of a free radical initiator, in the presence of 90 to 10 parts by weight of one or several epoxide resins or modified epoxide resins, in one or several solvents. Methods of synthesizing them, aqueous coating materials containing them and their use.

8 Claims, No Drawings

WATER-DILUTABLE VEHICLES BASED ON EPOXIDE RESINS, METHODS FOR THEIR SYNTHESIS AND THEIR USE AS AQUEOUS COATING MATERIALS AS WELL AS AQUEOUS COATING MATERIALS

BACKGROUND OF THE INVENTION

The invention relates to vehicles based on epoxide resins, which after neutralization with bases are dilutable with water and are suitable for aqueous coating materials. It also relates to a method for the synthesis of these vehicles.

The state of the art is the synthesis of water-dilutable, grafted epoxide resins by the reaction of solid epoxide resins with, for instance, carboxylic acid functional monomers, such as (meth)acrylic acid, the acid number of these resins based on the solid resin, ranging from 30 to 320 mg of KOH/g. Such a synthesis is described in the German patent 27 21 822.

Experience has shown that, with such dispersions with an acid number of less than 50, based on the solid resin, a deficient dispersion stability can be observed, which leads to large particles and precipitation phenomena. Aqueous dispersions of grafted epoxide resins with an acid number of less than 30 cannot by synthesized in stable form. For the protection of metallic substrates, it is necessary to obtain films with the lowest possible acid number, in order to achieve the highest protection for the metal.

SUMMARY OF THE INVENTION

It is therefore an object of the invention to provide water-dilutable vehicles based on epoxide resins with a low acid number, which, when neutralized, form stable dispersions and lead to satisfactory coatings.

Surprisingly, it was found that water-dilutable vehicles, which contain grafted and regular epoxide resins as well as addition polymers and/or copolymers, can be synthesized in a stable form with an acid number of less than 50 and do not have the disadvantages described above, if polymerizable, unsaturated, phosphoric acid-functional monomers are used as acids and a polymerization or copolymerization is carried out in the presence of epoxide resins with free epoxide groups.

The object of the invention therefore are water-dilutable vehicles based on epoxide resins with an acid number of 5 to 60, obtainable by polymerization or copolymerization from A) 10 to 90 parts by weight of one or several acidic, phosphoric acid-functional unsaturated monomers, which are polymerizable by a free radical mechanism and can be present in admixture with one or several ethylenically unsaturated monomers, which are also polymerizable by a free radical mechanism, with the addition of 0.5 to 15% by weight, based on the monomers used, of a free radical initiator, in the presence of B) 90 to 10 parts by weight of one or several epoxide resins or modified epoxide resins,
  the parts by weight of A) and B) adding up to 100 parts by weight in one or several solvents.

Preferably, the inventive vehicles have an acid number of less than 50 and particularly of less than 30. The lower limit preferably is at 8 and particularly at 12. Suitable as acidic phosphoric acid-functional, unsaturated monomers for the synthesis of the inventive, waterdilutable vehicles based on epoxide resins, are, for example, those of the following general formula

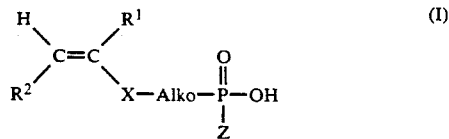

wherein
X = —COO—, —CONR$^1$—, —CO or —C$_n$H$_{2n}$—O—;
Z = —OH or —OR$^4$; and
Alk = alkylene with the formula —C$_n$H$_{2n}$—, which can have —OH groups as substituents, or cycloalkylene having the formula —C$_m$H$_{2m-2}$—
n = 1 to 6
m = 5 to 6
R$^1$ = —H, alkyl or cycloalkyl;
R$^2$ = —H or —COOR$^3$;
R$^3$ = H, alkyl or cycloalkyl; and
R$^4$ = alkyl or cycloalkyl,
it being possible for the R$^1$ groups to be the same or different.

If the ALKO group has OH substituents, then the —CH$_2$—CR$^1$(OH)—CH$_2$—O and —CH$_2$—(R$^1$)C(CH$_2$OH)—O— groups, wherein R$^1$ has the meaning given above, are preferred examples of the ALKO group.

Unless it is stated otherwise, the alkyl groups in the present specification and claims preferably have 1 to 4 carbon atoms and the cycloalkyl groups preferably have 5 to 6 carbon atoms.

In the above general formula I, —R$^1$, if alkyl, preferably is a methyl group. In the ALK-alkylene group, n preferably is 2 or 3.

The alkyl groups of the unsaturated, phosphoric acid-functional monomers can be linear, branched or cycloaliphatic. The steric arrangement of the substituents at the C=C double bond can be an (E) or a (Z) arrangement. Different phosphoric acid-functional monomers can also be used in admixture.

The use of phosphoric acid-functional monomers of formula (I) is particularly preferred, in which the Z substituent represents an —OH group.

Those skilled in the art are familiar with the monomers of formula I, which can be synthesized in the usual manner. Some of them are commercial products. The compounds of formula I are synthesized, for example, by reacting phosphorus oxychloride with hydroxyalkyl esters or hydroxyalkyl amides of appropriate unsaturated carboxylic acids, such as (methy)acrylic acid, or their derivatives. A further possibility for synthesizing these monomers is the reaction of derivatives of unsaturated carboxylic acids, such as unsaturated glycidyl esters and their derivatives, which contain epoxide groups, and unsaturated glycidyl amides, with phosphoric acids, for example, the reaction of glycidyl methacrylate with orthophosphoric acid.

The phosphoric acid-functional acidic monomers can be polymerized as such or together with one or several ethylenically unsaturated monomers, which can be polymerized by a free radical mechanism, in the presence of the epoxide resin component B) by a free radical mechanism.

The further monomers, which can be polymerized by a free radical mechanism, are admixed in such amounts, that, in coordination with the remaining reaction components A) and B), end products with the desired acid numbers are obtained. For this purpose, the amount of other monomers within component A), which can be polymerized by a free radical mechanism, generally is up to 95% by weight; preferably it is 95 to 30% by weight and particularly it is 90 to 60% by weight, based on the sum of the acidic phosphoric acid-functional monomers plus the other monomers, which can be polymerized by a free radical mechanism.

As further ethylenically unsaturated monomers for the possible combined use with the phosphoric acid-functional monomers of component A), practically all monomers, which can be polymerized by a free radical mechanism, come into consideration. However, the usual limitations for copolymerizations, which are given by the Q and e diagram of Alfrey and Price or the copolymerization parameters, apply (see, for example, Brandrup and Immergut, Polymer Handbook, 3rd edition, John Wiley and Sons, New York, 1989). Such monomers are, for example:

a) monomers, which can be polymerized by a free radical mechanism and contain no other reactive groups. They can be selected on the basis of the mechanical properties of the film and the compatibility of the resin combination used. Alkyl acrylates, alkyl methacrylates and dialkyl maleates and/or fumarates are used, the alkyl groups consisting of 1 to 20 carbon atoms and being arranged in a linear or branched aliphatic chain and/or as a cycloaliphatic and/or (alkyl)aromatic group. "Hard" monomers with a high glass transition temperature as homopolymers are, for example, monomers of vinyl derivatives or aromatic compounds, such as styrene, α-substituted styrenes such as α-methylstyrene, o-, m- and p-alkyl styrene, such as vinyltoluene or p-t-butylstyrene, halogenated vinylbenzenes, such as o- or p-chlorostyrene, methacrylate esters with a short chain, such as methyl methacrylate, ethyl methacrylate, propyl methacrylate, butyl methacrylate, cyclohexyl methacrylate, isobornyl methacrylate, dihydrodicyclopentadienyl methacrylate, (meth)acrylamide, N-substituted (meth)acrylamides and/or also (meth)acrylonitrile. "Soft" monomers, on the other hand, are acrylate esters with a long alkanol chain, such as n-butyl acrylate, isobutyl acrylate, t-butyl acrylate, 2-ethylhexyl acrylate and/or lauryl acrylate. Unsaturated ethers, such as ethoxyethyl (meth)acrylate or tetrahydrofurfuryl (meth)acrylate can also be used.

b) Copolymerizable, hydroxyl group-containing monomers, which, aside from a polymerizable, ethylenically unsaturated group, also contain at least one hydroxy group on the hydrocarbon backbone. They are mainly unsaturated esterification products of the general formula

$$R'' - CH = CR' - X - R''' \qquad (11)$$

wherein
 $R' = -C_nH_{2n+1}$, preferably $-CH_3$ or $-H$
 $R'' = R'$ or $-XC_nH_{2n+1}$
 $R''' = $ a linear or branched $C_{1-6}$ alkyl group with 1 to 3 OH groups
 $X = -COO-$ or $-CONH-$ and
 $n = 1$ to 6 and preferably 1;
 it being possible for the R' groups to be the same or different.

Particularly suitable are hydroxyalkyl (meth)acrylates such as hydroxyethyl acrylate, β-hydroxypropyl methacrylate, 1,4-butanediol-4-monoacrylate, propylene glycol monoacrylate, 2,3-dihydroxypropyl methacrylate, pentaerythritol monomethacrylate, polypropylene glycol monoacrylate or also dihydroxyalkyl fumarate, the linear, branched or cyclic alkyl group of which contains 2 to 20 carbon atoms. However, N-hydroxy($C_2$-$C_{15}$)alkyl (meth)acrylamides or N-hydroxy($C_2$-$C_{15}$)alkyl diamides of fumaric acid and preferably, for example, N-hydroxyethyl acrylamide or N-2-hydroxypropyl methacrylamide can also be used. Particularly elastic properties are obtained when a reaction product of hydroxyalkyl methacrylate and ε-caprolactone is used.

The expression, (meth)acrylic acid, used in the present specification, means methacrylic acid and acrylic acid; the same is true for the corresponding derivatives, such as the esters and amides.

c) α,β-unsaturated carboxylic acid amides, such as the diamide of maleic acid and fumaric acid, acrylamide, methacrylamide, the diamide of itaconic acid and their reaction products with formaldehyde, optionally also the corresponding ethers with low molecular weight monoalcohols, such as methanol, but also diacetone acrylamidoglycol methyl ether or methylacrylamidoglycol methyl ether, as well as cyclic imides, such as maleic imide and N-substituted malic imide, such as N-phenylmaleic imide. Preferably, acrylamide and methacrylamide are used.

Monomers of the vinyl ester type, preferably vinyl esters of α-branched monocarboxylic acids, particularly vinyl versatate or also N-vinylpyrrolidone, can also be copolymerized, if suitable reaction conditions and reaction comonomers are selected.

The vinyl monomers can be used by themselves or also in combination for the synthesis of copolymers. In addition, small proportions of bifunctional comonomers can also optionally be used, for example in amounts of 0.1 to 10% by weight and preferably 1 to 5% by weight, based on the total amount of the monomers. Examples of such comonomers are methylene-bis-acrylamide, oligo-ethyleneglycol-bis-acrylamide, butanediol diacrylate, hexanediol dimethacrylate and divinyl benzene, reaction products of diisocyanates and unsaturated alcohols or etherified methylol (meth)acrylamides with OH- or COOH-functional monomers, as well as reaction products of unsaturated glycidyl compounds and monomers containing carboxyl groups.

Preferably, the inventive, water-dilutable vehicles, which are formed by the graft polymerization of the monomers of component A) on the epoxide resin component B), do not have any free carboxyl groups in addition to the acidic phosphoric acid groups. At times, however, the use of small amounts of α,β-unsaturated monocarboxylic acids and/or dicarboxylic acid, such as maleic acid, fumaric acid, acrylic acid, methacrylic acid or itaconic acid together with the monomers of component A) proves to be advantageous. However, not more than 50% of the acid number should be introduced by carboxyl-functional monomers.

Suitable as epoxide resins of component B), in the presence of which the polymerization or copolymerization of the monomers of component A) takes place, are, for example, epoxide group-containing polyglycidyl ethers with the following idealized general formula III: wherein $R^5$ = alkyl having the formula —$C_mH_{2m+1}$— and/or preferably —H;
$R^6$ = —$(CR^5_2)_m$— and preferably —$CH_2$—

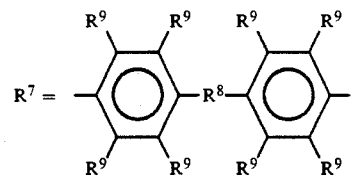

$R^8$ = —$SO_2$—, —O— and preferably —$CR_2^9$—;
$R^9$ = halogen or $R^5$, it being possible for the $R^9$ groups to be the same or different
n' = 0 to 15 and preferably 6 to 13;
m' = 1 to 8 and preferably 1, it being possible for the $R^5$ groups to be the same or different.

Particularly suitable examples are reaction products of different molecular weight of dihydroxy-diphenyl-propane (bisphenol A) or dihydroxy-diphenylmethane (bisphenol F) and epichlorohydrin and/or methylepichlorohydrin. Products of higher molecular weight can also be synthesized by different methods, such as the reaction of liquid polyepoxides with bisphenol A. These polyglycidyl ethers have en epoxide equivalent weight of 180 to 5,000, particularly of 1,500 to 5,000 and especially of 2,000 to 4,000. They have a molecular weight particularly of 300 to 8,000. They can be hydrogenated partially or completely or used in mixtures of materials of different epoxide equivalent weight or of different structure. Polyglycidyl ethers of phenolic novolak resins, by means of which the functionality can be increased from 2 to about 6 glycidyl groups per molecules, are also suitable. The functionality of the resins can be decreased by reaction with monofunctional alkylphenols or monocarboxylic acids and preferably with α-branched monocarboxylic acids. For purposes of elastification, a portion of the polyglycidyl ether described can be replaced by an aliphatic polyglycidyl ether having the formula

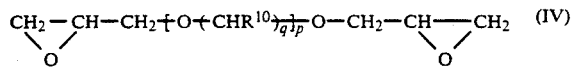

wherein $R^{10}$ = H or a low molecular weight alkyl group, which optionally is substituted in various ways, and q = 2 to 6 and p = 3 to 50. Examples are reaction products of epichlorohydrin and polypropylene glycol or polybutylene glycol of different molecular weights. The epoxide resins can also be modified or synthesized stepwise by reaction with longer chain dicarboxylic acids, such as isophthalic acid, cyclohexane dicarboxylic acid, adipic acid or sebacic acid or by reaction with long-chain polyalcohols such as 1,6-hexandiol, glycerin, monoanhydropentaerythritol, polytetrahydrofurandiol, polycaprolactonediol, polycaprolactamdiol or polybutadienediol, as well as NCO-terminated reaction products of polyalcohols and polyisocyanates or semi-blocked diisocyanates.

The synthesis of the binders containing the inventive, grafted epoxide resins is accomplished by reacting an appropriate monomer mixture, which contains sufficient of the acidic, phosphoric acid-functional, unsaturated compound to adjust the acid number of the end product to a value below 60, preferably below 50 and particularly below 30 mg of KOH per gram of solid resin, in the presence of a suitable free radical initiator with an epoxide resin in a solvent. The lower limit of the acid number is 5, preferably 8 and particularly 12.

The amount of free radical initiator used for the reaction is 0.5 to 15% by weight, based on the monomers used. Preferably it is more than 2% by weight and particularly more than 4% by weight of the monomers. The upper limit for the amount of initiator is at 15% by weight, preferably at 12% by weight and particular at 8% by weight. As free radical initiators, the compounds customarily used for this purpose in macromolecular chemistry, such as organic peroxides or organic azo compounds can be used. The free radical initiators can be used individually or as a mixture.

Examples are peroxides, such as dialkyl peroxides, for example, di-t-butyl peroxide; diacyl peroxides, such as dibenzoyl peroxide; peroxycarboxylic acids, such as peroxyacetic acid; peroxodicarbonates, such as di-sec.-butyl-peroxydicarbonate; peroxide esters, such as 2-ethylhexanoic acid t-butyl perester; hydroperoxides, such as cumene hydroperoxide and ketone peroxides, such as methyl ethyl ketone peroxide.

Examples of azo compounds are azodinitriles, such as azobisisobutyronitrile and the appropriately substituted compounds. The class of diacyl peroxides represents particularly suitable initiators for the grafting polymerization. The use of dibenzoyl peroxide is particularly preferred.

The synthesis is carried out in a solvent or solvent mixture. The use of water-miscible solvents is preferred. Examples of such solvents are water-soluble organic compounds, such as linear, branched or cycloaliphatic alcohols, alkylene glycols and polyethylene glycols and their mono- or diethers or mono- or diesters, ketone alcohols or cyclic ethers, such as n-butanol, sec-butanol, butoxyethanol, dipropylene glycol dimethyl ether, ethylene glycol acetate, diacetone alcohol, tetrahydrofuran or dioxane.

If water-immiscible solvents were used, they must be removed after neutralization of the product obtained and dilution with water, for exmaple, by distillation.

The amount of solvent used for the synthesis depends on the starting material used. It is selected so that a usable working viscosity of the end product obtained is achieved. In general, such a viscosity is obtained at a solids content of, for example, up to 70% by weight of end product.

For the synthesis, the epoxide resin is dissolved in the solvent or solvent mixture and mixed with the monomers and the free radical initiator, whereupon the reaction is initiated by heating. The monomers and initiator can be added separately or as a mixture. Preferably, the monomer/initiator mixture is slowly added dropwise over a longer period of time at the reaction temperature, so that the concentration of monomers is relatively low.

The reaction is carried out at the conventional temperatures, which are known to those skilled in the art and which are adapted to the half life of the initiator used. These temperatures fall within the range of, for example, 60° to 180° C. With dibenzoyl peroxide, the reaction can be carried out, for example, at 100° to 140° C. and particularly at 110° to 130° C. Under these conditions, a mixture of epoxide resin, which has and has not been grafted, and addition copolymer is formed. The acid number of this mixture falls within the range of values given above and is sufficient, after neutralization with a base, for example, an organic base such as ammonia and/or amines, preferably aminoalcohols, to ensure water dilutability.

In the inventive, water-dilutable vehicle, the amount of epoxide component, based on the solid resin, is more than 10% by weight, preferably more than 40% by weight and as high as 90% by weight. Particularly good coating materials are obtained when the epoxide resin constitutes 60 to 90% by weight. The remaining portion consists of the unsaturated monomers used and of the incorporated products of splitting the free radical initiator.

A special form of synthesis consists therein that either the phosphoric acid-functional monomer or the epoxide resin grafted therewith is reacted with a saturated monoepoxide compound, such as a monoglycidyl ester or ether or a monoepoxy alkane, for example, the glycidyl ester of versatic acid (Cardura E-10 ®), vinyl glycidyl ether or 1,2-epoxyoctadecane and that the diesters or triesters, which are formed, are subsequently split with water.

For the synthesis of aqueous dispersions, the inventive vehicles are neutralized with ammonia or organic bases, such as amines and preferably aminoalcohols. Tertiary amines and tertiary aminoalcohols are preferred. When ammonia or primary and secondary amines are used, any free epoxide groups still present must previously be removed in the usual manner, for example, by hydrolysis or reaction with compounds containing reactive hydrogens, such as monophenols, mercaptans, monocarboxylic acids or monoalcohols.

Examples, of amines, which can be used for the neutralization, are primary, secondary and/or tertiary alkylamines, these amines containing identical or different alkyl or alkanol groups. Special examples of amines and aminoalcohols are triethylamine, diethylamine, dimethylaminoethanol, dimethylaminoisopropanol, morpholine, N-ethylmorpholine, aminopropanol, dimethylaminomethylpropanol, diethanolamine and triethanolamine.

After the neutralization of the phosphoric acid groups and/or any carboxylic acid groups that may be present, the dispersion is produced by the gradual addition of water while stirring well, for example, at temperatures from 20° to 95° C. In general, the dispersion has an average particle size of less than 1,000 nm, preferably of less than 500 nm and particularly of less than 300 nm.

Before the neutralization, it may frequently be advantageous to split any diester and triester phosphates, which may be present, hydrolytically to monoesters, in order to achieve the desired solubility and to decrease an undesirably high molecular weight and high viscosities. This can be achieved, for example, with sufficient amounts of water at temperatures of 50° to 150° C., under pressure if necessary.

To produce the dispersions, it is also possible to add organic solvents, for example, in order to achieve suitable viscosities. It is advantageous to use those organic solvents, which were already used for the synthesis of the water-dilutable epoxide resins. Examples are water-soluble organic compounds, such as linear, branched or cycloaliphatic alcohols, alkylene glycols or polyethylene glycols or their mono- or diethers or mono- or diesters, ketone alcohols or cyclic ethers, such as n-butanol, sec-butanol, butoxyethanol, dipropylene glycol dimethyl ether, ethylene glycol acetate, diacetone alcohol, tetrahydrofuran or dioxane. The lowest possible amounts of solvents, that is, less than 15% by weight and preferably less than 5% by weight, based on the dispersion, are used. After the dispersion is prepared, excess solvents can be removed. If water immiscible solvents, for example, are used for the preparation of the dispersion, then they can be distilled off after the neutralization and dilution with water.

The inventive, water-dilutable vehicles, which are based on epoxide resins, are suitable for the preparation of aqueous, heat-curable coating materials. They can be used together with conventional cross linking agents.

For the preparation of aqueous, heat-curable curing materials with extraneous cross linking agents, it is possible to mix, for example, 60 to 95 parts by weight of the vehicle, based on the grafted epoxide resin, with 5 to 40 parts by weight of a conventional cross linking agent, such as a partially or completely etherified amine-formaldehyde condensation resin and/or a partially or completely etherified phenol-formaldehyde condensation resin and/or a blocked polyisocyanate with at least 2 reactive sites per molecule. The parts by weight refer in each case to the resin solids and add up to 100 parts by weight. The mixing is carried out either before the neutralization in the organic phase or in the neutralized, aqueous dispersion, preferably at room temperature or by heating briefly to 90° C.

Examples of usable cross linking agents are given in the following: amine-formaldehyde condensation resins, which are formed, for example, by the reaction of aldehydes with urea, N-alkylurea, dicyandiamide, various triazines, such as melamine, benzoguanamine and acetoguanamine or their mixtures. The aldehydes for this reaction can be monofunctional or polyfunctional. Examples of these are formaldehyde and its polymerization products, such as paraformaldehyde, polyoxymethylene, trioxane or aliphatic and cyclic aldehydes, such as glyoxal, acetaldehyde, acrolein, propionaldehyde, butyraldehyde and furfural. Resins of different molecular weights and different reactivity are obtained, depending on the reaction conditions (pH and temperature) and on the degree of methylolation. The condensation with formaldehyde, furfural, paraformaldehyde, polyoxymethylene or trioxane, is generally carried out with the addition of weak acids or bases as catalyst. Strong acids are used, for example, for the condensation with acrolein, glyoxal, acetaldehyde, propionaldehyde or butyraldehyde. For this reaction, the primary reaction product is neutralized. The aldehyde is then added and reacted with the addition of weak acids or bases. The preferred aldehyde is formaldehyde. The alcohol groups, preferably methylol groups, of the aldehyde condensation products are partially or, preferably, completely etherified with alcohols. Amine-formaldehyde resins, the bulk of the methylol groups of which are reacted with monoalcohols or their mixtures, are preferred. Particularly preferred are methanol, ethanol, propanol, butanol, heptanol, benzyl alcohol and other aromatic alcohols, cyclic alcohols, as well as ethoxyethanol or butoxyethanol. If alcohols with more than 4 carbon atoms are to be incorporated, the methylol groups is etherified first with a low molecular weight alcohol. The higher molecular weight alcohol is introduced subsequently by transetherification. The preferred alcohols are lower molecular weight aliphatic alcohols, such as methanol and/or butanol and its isomers. Particularly preferred are melamine resins, which have been reacted with 3 to 6 moles of formaldehyde and subsequently etherified completely with methanol. The resins are synthesized according to the state of the art and are offered as commercial products by many companies. If etherified with hydroxycarboxylic acids, such as hydroxybenzoic acid, salicylic acid or dimethylolpropionic acid, carboxyl group-containing melamine resins are formed. On the other hand, if the etherification is carried out with hydroxyalkyl (meth)acrylates or allyl alcohol, unsaturated melamine resins are formed. Conventional, carbamyl methylated melamine resins, which are synthesized by reacting alkoxymethylated melamine resins with alkyl carbamates under weakly acidic conditions, can also be used.

Examples of preferred phenolic resins, which can be used as cross linking agents, are reaction products of phenol or substituted phenols with various aldehydes in a molar excess in the presence of alkaline catalysts (resol type). Examples of phenolic compounds are phenol, cresol, xylenol, resorcinol and substituted phenols, such as p-t-butylphenol, p-t-amylphenol, p-phenylphenol, isothymol, cardanol or also polynuclear phenols, such as dihydroxy-diphenylpropane (bisphenol A) or dihydroxy-diphenylmethane (bisphenol F.). Further suitable starting materials are phenolic novolak resins, which optionally are defunctionalized with monocarboxylic acids, preferably α-branched monocarboxylic acids, monophenols, which are substituted particularly with $C_2$ to $C_{18}$ alkyl groups or also monoepoxides, such as α-monoepoxide alkanes, monoglyceride ethers or monoglyceride esters. Formaldehyde and its polymerization products, such as paraformaldehyde, trioxymethylene, polyformaldehyde and also hexamethylenetetramine are used as aldehydes. Acetaldehyde, paraldehyde and metaldehyde, as well as butyraldehyde and furfural are also very suitable. The methylol groups are etherified partially or, preferably, completely with methanol, ethanol, propanol and/or butanol. Resins, which are reacted in an alkaline medium with an excess of formaldehyde per phenolic OH group, that is, with about 1.1 to 2.5 moles of formaldehyde, are preferred. Resins based on bisphenol A, which are reacted with about 4 moles of formaldehyde and etherified completely with butanol, are particularly preferred. Water insoluble, as well as carboxyl group-containing phenolic resins of different molecular weights can be used. Phenol carboxylic acids, which are suitable for this purpose, are, for example, 4,4-bis-(4-hydroxyphenyl)-pentanoic acid, glycolic acid derivatives of bisphenols, such as 2-(4-hydroxyphenyl)-2-(carbethoxyphenyl)-propane, or salicylic acid. Very low molecular weight, optionally unsaturated methylolphenol ethers, such as trimethylolphenol allyl ether (Methylon ® resins), can also be used.

A further group of examples of cross linking agents is represented by the class of capped isocyanates. As capped isocyanates, any isocyanates can be used, the isocyanate groups of which have been reacted with a compound, which contains active hydrogen. The capped isocyanates react at an elevated temperature, usually between about 90° and 220° C. with the base resin. Blocked polyisocyanates are synthesized, for example, by reacting a multifunctional isocyanate with at least a stoichiometric amount of a monofunctional compound, which contains an active hydrogen (Zerewitinoff reaction), advisably at temperatures of 50° to 80° C. If necessary, conventional catalysts, such as basic catalysts, such as tertiary amines or small amounts of tin salts, such as dibutyl tin dilaurate, can be added. Polyisocyanates or appropriate prepolymers, which contain isocyanate groups, are used as isocyanates. The organic polyisocyanates have an average molecular weight of 112 to 5,000 and preferably of 140 to 1,000 and advisably an average isocyanate functionality of 2 to 8. Suitable polyisocyanates are, for example, compounds of the idealized formula $$E(N=C=O)_s \qquad (V)$$

wherein
E represents an aromatic hydrocarbon group, which optionally is substituted with one or several alkyl groups or has methylene bridges and has a total of 6 to 15 carbon atoms, an aliphatic hydrocarbon group with 2 to 18 and preferably 6 to 10 carbon atoms, a cyclic hydrocarbon group with 6 to 15 carbon atoms or a heterocyclic ring and
s represents a number from 2 to 5 and preferably 2 to 3.

Typical examples of such polyisocyanates are propylene diisocyanate, ethylethylene diisocyanate, dimethylethylene diisocyanate, trimethylene diisocyanate, tetramethylene diisocyanate, pentamethylene diisocyanate, hexamethylene diisocyanate, trimethylhexane diisocyanate, 1,12-dodecane diisocyanate, 1,18-octadecane diisocyanate, cyclopentane diisocyanate, 1,3-cyclohexane diisocyanate, 1,4-cyclohexane diisocyanate, as well as any mixtures of these isomers, methylcyclohexane diisocyanate, m- or p-tetramethylxylene diisocyanate, 1-isocyanato-3,3,5-trimethyl-5-isocyanatomethyl-cyclohexane, perhydro-2,4'-diphenylmethane diisocyanate and/or perhydro-4,4'-diphenylmethane diisocyanate, 1,3-phenylene diisocyanate, 1,4-phenylene diisocyanate, 2,4-and 2,6-toluylene diisocyanate, as well as any mixtures of these isomers, xylylene diisocyanate, diphenylmethane-2,4'-diisocyanate and/or diphenylmethane-4,4'-diisocyanate, 3,2'- and/or 3,4'-diisocyanato-4-methyldiphenylmethane, bisphenylene diisocyanate, naphthylene-1,5-diisocyanate, triphenylmethane-4,4',4''-triisocyanate, 2,2',4,4'-tetraisocyanato-5,5'-dimethyltriphenylmethane, diphenyl tetraisocyanate and naphthyl tetraisocyanate. Mixed aliphatic and aromatic compounds are also suitable. Especially preferred are diisocyanates, which are produced on an industrial scale, such as toluylene diisocyanate, hexane diisocyanate, isophorone diisocyanate or dicyclohexylmethane diisocyanate. Aside from the low molecular weight polyisocyanates, which have been named by way of example, higher molecular weight isocyanate polymers, which are based on polyisocyanates having no urethane groups and higher molecular weight polyhydroxy compounds and are known in polyurethane chemistry, can also be used. Advisably, (n+1) moles of the above-described diisocyanates are reacted here with n moles of a difunctional compound, which is reactive towards isocyanate, at temperatures advisably from 50° to 120° C. in the melt or in the presence of inert solvents, which can be of low molecular weight as well as of high molecular weight with a molecular weight of 62 to 5,000 and preferably of 90 to 1,000. If the reaction is carried out with an excess of diisocyanate, the excess diisocyanate must be distilled off once again. The low molecular weight dialcohols are advisably understood to be the different isomers of linear, branched and cyclic hydrocarbon compounds with 2 to 20 carbon atoms and two secondary and/or primary hydroxyl groups. Typical examples of these are 1,4-butanediol, 1,6-hexanediol, trimethylhexanediol, bis(hydroxymethyl)cyclohexane, neopentyl glycol, neopentyl glycol hydroxypivalate, N-methyldiethanolamine or bis-ethoxylated bisphenol A. Suitable higher molecular weight polyhydroxyl compounds are the polyesterdiols, polycaprolactonediols, polycaprolactamdiols and polyglycoletherdiols, which are known from polyurethane chemistry. Long-chain primary and secondary diamines, such as 1,6-hexanediamine, adducts of 2 moles of glycidyl ether or glycidyl ester and hexanediamine, N,N'-cyanoethylethylenediamine or bis-N,N'-cyanoethylpolyoxypropylenediamine can also be used.

Particularly the so-called "lacquer polyisocyanates", which are synthesized from known diisocyanates, are suitable as polyisocyanates. For example, tris-(6-isocyanatohexyl)biuret is formed from hexane diisocyanate and water. By trimerizing hexane diisocyanate, tris-(6-isocyanatohexyl) isocyanuate, optionally in admixture with its higher homologs, is obtained, as well as other polyisocyanates, which have isocyanurate groups and are formed from isophorone diisocyanatotoluene or mixtures of diisocynatotoluene and hexamethylene diisocyanate. Additional polyisocyanates, which can be used very well, are polyisocyanates, which have urethane groups and are obtained, for example, by the reaction of excessive amounts of 2,4-diisocyanatotoluene with simple, multihydric alcohols of molecular weight 62 to 300, particularly trimethylolpropane, the unreacted diisocyanate excess being removed by distillation, if necessary. For example, blocked triisocyanates or blocked higher molecular weight reaction products of triisocyanates with dialcohols are particularly preferred. Approximately the following molar ratios are maintained for this reaction: triisocyanate:diol:protective group=$y:(y-1):(y+2)$, wherein y is 1 to 6 and preferably 2 to 3. Materials, which block the isocyanates, contain only a single amine, amide, imide, lactam, thio or hydroxyl group. In general, volatile compounds, which contain active hydrogen and have a low molecular weight of, preferably not more than 300 and, particularly, not more than 200, are used. For example, the following have proven their usefulness: aliphatic or cycloaliphatic alcohols, such as n-butanol, 2-ethylhexanol, cyclohexanol, phenols, t-butylphenols, dialkylaminoalcohols such as dimethylaminoethanol, oximes such as methyl ethyl ketone oxime, lactams such as $\epsilon$-caprolactam or 2-pyrrolidone, imides such as phthalimide of N-hydroxy-maleic acid imide, hydroxyalkyl esters, malonate esters and acetoacetate esters. However, $\beta$-hydroxyglycols or $\beta$-hydroxyglycol ethers and glycolamides are also recommended. Oximes and lactams are of particular interest as capping agents, because the polyisocyanates capped therewith react at relatively low temperature. More than one type of blocking group, preferably those with different reactivities, can also be used for the blocking. It is, for example, possible to use a mixture of two or more different, blocked polyisocyanates or a polyisocyanate, which is blocked with two or more different protective groups.

The inventive, water-dilutable vehicles are very suitable for producing aqueous coating materials. For this purpose, they are used with cross linking agents, as described above.

The invention, accordingly, also relates to aqueous coating agents, which contain the inventive vehicles that are diluted with water after neutralization, as well as cross linking agents. Moreover, the aqueous coating materials can contain pigments, fillers, organic solvents, as well as other conventional lacquer additives. They may have a solids content of 20 to 50% by weight.

Conventional inorganic or organic pigments or fillers are suitable as pigments and fillers. In general, pigments and/or fillers are used in such amounts, that the ratio of pigment to the inventive vehicle is 0 to 1.2:1, based on the weight.

The total content of pigments, fillers and/or other lacquer additives in the aqueous coating material preferably is up to 25% by weight, based on the weight of the whole aqueous dispersion.

As organic solvents, conventional lacquer solvents are added, for example, those given for the preparation of the vehicle. The solvent content of the inventive, aqueous coating material can amount, for example, up to 15% by weight.

Those skilled in the art are familiar with conventional lacquer additives, which may be, for example, cross linking catalysts, corrosion inhibitors, levelling agents, defoamers or thickening agents.

The aqueous coating materials, which are prepared using the inventive vehicles, can be applied in the usual manner on various substrates, particularly on metal substrates such as steel, tinned sheet metal and aluminum. The materials can be applied by dipping, spraying or electrophoretic coating. Coatings, which are prepared using the inventive vehicles, can be processed in thin layers, for example, by drying at elevated temperatures of 120° to 250° C., to adhering, mechanically and chemically resistant coatings.

The inventive coating vehicles are particularly suitable for the preparation of coating materials for lacquering cans. The property advantages with respect to adhesion and resistance to chemical attack are particularly favorable in the case of tinned steel. The inventive materials are therefore particularly suitable for lacquering cans of tinned sheet metal. Preferably, the coating materials are prepared as clear lacquers without the addition of pigments and/or fillers.

The following examples are intended to explain the invention, it being understood that the examples are given by way of illustration and not by way of limitation.

PREPARATION OF THE VEHICLE

Example 1

A conventional, commercial epoxide resin (919.4 g), with an epoxide equivalent weight of 2,500 to 4,00, is dissolved by raising the temperature to 122° C. in a mixture of 259.6 g of butyl glycol, 474 g of n-butanol and 31.6 g of xylene. A mixture of monomers, consisting of 57.1 g of methacroyloxyethyl monophosphate, 176.5 g of styrene, 1.8 g of ethyl acrylate and 16.4 g of benzoyl peroxide, dissolved in 63.2 g of butyl glycol, is added dropwise, over a period of 2 hours, with stirring and under a stream of an inert gas, to the clear, hot solution. The reaction mixture is subsequently held for a further 3 hours at 122° C. A resin solution is obtained, which has an acid number of 21 mg KOH/g, based on the solid resin.

Example 2

A resin solution, with an acid number of 13 mg of KOH/g based on the solid resin, is obtained as in Example 1, when a monomer mixture of a combination of 32.9 g of methacroyloxyethyl monophosphate, 200.7 g of styrene and 1.8 g of ethyl acrylate is used.

Example 3

By using a monomer mixture of 93.5 g of methacroyloxyethyl monophosphate, 140.1 g of styrene and 1.8 g of ethyl acrylate, a resin solution with an acid number of 33 mg of KOH/g based on the solid resin, is obtained as in Example 1.

PREPARATION OF AQUEOUS COATING MATERIALS

Coating materials were prepared by neutralizing the epoxide-based vehicle prepared in the preceding examples, diluting with fully deionized water to reduce the proportion of nonvolatile components to about 24% by weight, adding the cross linking agents described below in various proportions, lacquering onto aluminum panels, electrolytically tinned sheet metal and steel and stoving the films obtained. The adhesion was subsequently checked by the adhesive tape tear-off test. In addition, the cross linking was investigated by the solvent rub test.

Example 4

100 parts by weight of the vehicle of Example 1
1.5 parts by weight of dimethylethanolamine
130.0 parts by weight of fully deionized water.

The fully deionized water was added slowly; a water mountain (increase in viscosity) developed, but was exceeded. For the cross linking, a conventional, commercial phenol-formaldehyde resin was used in the ratio of 90:10 (based on the weight of the solids). The samples were applied on electrolytically tinned sheet metal with a doctor blade or by spraying to a dry film thickness of 8 to 10 μm and dried for 10 minutes at 200° C. in a circulating air oven. The adhesive tape tear-off test revealed good adhesion. The solvent rub test with methyl ethyl ketone revealed a good resistance of 20 double rubs.

Example 5

100 parts by weight of the vehicle of Example 1
3.0 parts by weight of dimethylethanolamine
127.0 parts by weight of fully deionized water.

The fully deionized water could be incorporated well. For the cross linking, a conventional, commercial melamine resin (hexamethylmelamine etherified with methyl alcohol, cymel ® 303) was incorporated in the ratio by weight of 95:5 (based on the solids content). The rest of the procedure was similar to that described for Example 4, aluminum panels and steel panels being used as substrates.

At an add-on that resulted in a film 8 to 10 μm thick, there was good adhesion at 18 double rubs on the electrolyte sheet metal; the adhesion was also good on aluminum. A solvent resistance test of 26 double rubs was obtained.

Example 6

100 parts by weight of the vehicle of Example 3
3.0 parts by weight of dimethylethanolamine
132.0 parts by weight of fully deionized water.

A 100% neutralization was carried out, the procedure of Example 5 being followed. The conventional, commercial melamine resin of Example 5 was used as cross linking agent. The ratios of vehicle to cross linking agent used are given in the following Table as "vehicle ratio" (based on the respective weight of solids). In the following Table, electrolytically tinned sheet metal, aluminum panels and sand-blasted sheet steel were used as substrates. The results for adhesion (adhesion tape) and the methyl ethyl ketone solvent test (MEK test) are given for the layers of various thicknesses (add-ons). The coating material samples tested were unchanged and stable after a 14-day storage at room temperature.

TABLE
(for Example 6)

| | Electrolytically tinned sheet metal | | |
|---|---|---|---|
| Vehicle ratio | 95:5 | 93:7 | 90:10 |
| Thickness | 8–10 μm | 8–10 μm | 8–10 μm |
| MEK test | 28 double rubs | 60 double rubs | >100 double rubs |
| Adhesion | good | good | good |
| | Aluminum panel | | |
| Vehicle ratio | 95:5 | 93:7 | 90:10 |
| Thickness | 8–10 μm | 8–10 μm | 8–10 μm |
| MEK test | 25 double rubs | 40 double rubs | 90 double rubs |
| Adhesion | good | good | good |
| | Steel sheet, sand blasted | | |
| Vehicle ratio | 95:5 | 93:7 | 90:10 |
| Thickness | 15–20 μm | 15–20 μm | 15–20 μm |
| MEK test | 25 double rubs | 65 double rubs | >100 double rubs |
| Adhesion | good | good | good |

We claim:

1. An epoxide based vehicle for a coating, that is water dilutable after neutralization with a base, prepared by polymerization or copolymerization in the presence of from 90 to 10 parts by weight of one or more epoxide or modified epoxide resins, with from 0.5% to 15% wt. of a free radical polymerization initiator, of from 10 to 90 parts by weight of one or more phosphoric acid functional unsaturated free radical polymerizable monomers, optionally in admixture with one or more ethylenically unsaturated free radical polymerizable monomers, wherein all parts by weight add up to 100.

2. The water-dilutable vehicle of claim 1, which is based on epoxide resin wherein the epoxide resin used for the preparation is a polyglycidyl ether of one or several bisphenols with a molecular weight of 300 to 8,000, which can be replaced partially by aliphatic polyglycidyl ethers.

3. The water-dilutable vehicle of claim 1, which is based on epoxide resin, wherein the free radical polymerizable, phosphoric acid-functional, unsaturated monomer, used for the preparation, is a compound of the general formula:

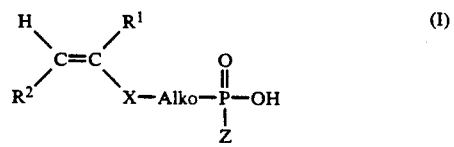

wherein $X = -COO-$, $-CONR^1-$, $-CO$ or $-C_nH_{2n}-O-$;

$Z = -OH$ or $-OR^4$; and

Alk = alkylene with the formula $-C_nH_{2n}-$, which can have $-OH$ groups as subsituents or cycloalkylene having the formula $-C_mH_{2m-2}$ $n = 1$ to 6

$m = 5$ to 6

$R^1$ = —H, alkyl or cycloalkyl;
$R^2$ = —H or —COOR$^3$;
$R^3$ = H, alkyl or cycloalkyl; and
$R^4$ = alkyl or cycloalkyl,
it being possible for the $R^1$ groups to be the same or different.

4. Method for the preparation of water-dilutable vehicles based on epoxide resin according to claim 1, characterized in that, in the presence of one or several solvents, A) 10 to 90 parts by weight of one or several acidic, phosphoric acid-functional unsaturated monomers, which are polymerizable by a free radical mechanism and can be present in admixture with one or several ethylenically unsaturated monomers, which are also polymerizable by a free radical mechanism, with addition of 0.5 to 15% by weight, based on the monomers used, of a free radical initiator, are polymerized in the presence of B) 90 to 10 parts by weight of one or several epoxide resins or modified epoxide resins, the parts by weight of A) and B) adding up to 100 parts by weight, and, after neutralization with bases, are diluted with water.

5. The method of claim 1, characterized in that free radical polymerizable, ethylenically unsaturated monomers are added to component A) in such an amount, that a vehicle with an acid number of 5 to 60 results.

6. Aqueous coating material with a solids content of 20 to 50% by weight, containing a vehicle, which is water dilutable due to neutralization with bases, in combination with a cross linking agent as well as, optionally, pigments, fillers, organic solvents and/or conventional lacquer additives, characterized in that it contains, based on the resin solid portion A) 60 to 95% by weight of a vehicle of one of the claims 1 and B) 5 to 40% by weight of one or several cross linking agents based on a partially or completely etherified amine-formaldehyde condensation resins and/or phenol-formaldehyde condensation resins and/or blocked polyisocyanates.

7. The aqueous coating material of claim 1, characterized in that it contains 0 to 15% by weight of one or several organic solvents and 0 to 25% by weight of pigments, fillers and/or other conventional lacquer additives, based in each case on the weight of the total coating agent.

8. The aqueous coating material of claim 1, characterized in that it is formulated as a clear lacquer.

* * * * *